United States Patent
Saitou (10) Patent No.: US 11,002,366 B2
(45) Date of Patent: May 11, 2021

(54) GATE VALVE DEVICE

(71) Applicant: ULVAC, INC., Kanagawa (JP)

(72) Inventor: Shuuji Saitou, Kanagawa (JP)

(73) Assignee: ULVAC, INC., Kanagawa (JP)

(*) Notice: Subject to any disclaimer, the term of this patent is extended or adjusted under 35 U.S.C. 154(b) by 0 days.

(21) Appl. No.: 17/097,788

(22) Filed: Nov. 13, 2020

(65) Prior Publication Data

US 2021/0062921 A1    Mar. 4, 2021

Related U.S. Application Data

(63) Continuation-in-part of application No. PCT/JP2019/012360, filed on Mar. 25, 2019.

(30) Foreign Application Priority Data

Jun. 12, 2018 (JP) .............................. JP2018-112298

(51) Int. Cl.
*F16K 3/24* (2006.01)
*F16K 3/02* (2006.01)
(Continued)

(52) U.S. Cl.
CPC ............... *F16K 3/243* (2013.01); *F16K 3/02* (2013.01); *F16K 3/0227* (2013.01);
(Continued)

(58) Field of Classification Search
CPC ........ F16K 3/243; F16K 39/04; F16K 31/122; F16K 51/02; F16K 3/0281; F16K 31/12
(Continued)

(56) References Cited

U.S. PATENT DOCUMENTS

| 5,266,116 A | 11/1993 | Fujioka et al. |
| 5,296,036 A * | 3/1994 | Matsuyama ......... C23C 16/545 118/718 |

(Continued)

FOREIGN PATENT DOCUMENTS

| CA | 2106551 A1 | 4/1994 |
| JP | 62-13208 U | 1/1987 |

(Continued)

OTHER PUBLICATIONS

International Search Report and Written Opinion for PCT Patent App. No. PCT/JP2019/012360 (dated Jun. 18, 2019) with English language translation thereof.

(Continued)

*Primary Examiner* — John Bastianelli
(74) *Attorney, Agent, or Firm* — Cermak Nakajima & McGowan LLP; Tomoko Nakajima (57) ABSTRACT

A gate valve has a communication block with a communication passage and a valve unit having a valve plate movable between a partitioning position and an open position. A lower end part of the valve plate comes into pressurized contact with a surface of a band-shaped base material transferred through the communication passage between a first chamber and a second chamber. Due to a force of this pressurized contact, a back surface of the base material is seated on a seating surface provided in the communication passage. A groove is formed in the lower end of the valve plate, and a roller-shaped sealing member with a central shaft is inserted into the groove. Opening parts are formed in both axial side-wall surfaces of the groove such that the end parts of the central shaft of the sealing member are inserted into the opening parts and pivotally supported with a clearance.

3 Claims, 6 Drawing Sheets (51) Int. Cl.
*F16K 3/316* (2006.01)
*F16K 39/04* (2006.01)
*F16K 51/02* (2006.01)
*F16K 31/122* (2006.01)

(52) U.S. Cl.
CPC ............ *F16K 3/0281* (2013.01); *F16K 3/316* (2013.01); *F16K 39/04* (2013.01); *F16K 51/02* (2013.01); *F16K 31/122* (2013.01)

(58) Field of Classification Search
USPC .................................. 251/326–329, 331, 12
See application file for complete search history.

(56) References Cited

U.S. PATENT DOCUMENTS

| | | | |
|---|---|---|---|
| 5,382,531 A | | 1/1995 | Fujioka et al. |
| 5,951,835 A | * | 9/1999 | Namiki .................. C23C 14/54 |
| | | | 204/298.24 |
| 6,338,872 B1 | * | 1/2002 | Yoshino .............. C23C 16/4401 |
| | | | 427/248.1 |
| 6,685,163 B2 | * | 2/2004 | Blecha ...................... F16K 3/00 |
| | | | 251/328 |
| 8,132,782 B2 | * | 3/2012 | Duelli .................... F16K 51/02 |
| | | | 251/193 |
| 2005/0199849 A1 | | 9/2005 | Sauer |
| 2010/0252604 A1 | | 10/2010 | Lycette |
| 2011/0147982 A1 | | 6/2011 | Nishio et al. |
| 2012/0280153 A1 | | 11/2012 | Dunser et al. |
| 2013/0221252 A1 | | 8/2013 | Eijkelenberg et al. |
| 2014/0175310 A1 | * | 6/2014 | Coppola ................... F16K 1/44 |
| | | | 251/85 |
| 2016/0377183 A1 | * | 12/2016 | Coppola ................... F16K 1/46 |
| | | | 251/328 |

FOREIGN PATENT DOCUMENTS

| | | |
|---|---|---|
| JP | 63-201266 U | 12/1988 |
| JP | 3-114687 U | 11/1991 |
| JP | 4-36189 U | 3/1992 |
| JP | 4-299823 A | 10/1992 |
| JP | 04-346220 A | 12/1992 |
| JP | 6-129565 A | 5/1994 |
| JP | 2000-216094 A | 8/2000 |
| JP | 2005-265177 A | 9/2005 |
| JP | 2011-144922 A | 7/2011 |
| JP | 2012-233579 A | 11/2012 |
| JP | 2015-512016 A | 4/2015 |

OTHER PUBLICATIONS

Notice of Allowance for Japanese Patent App. No. 2019-546045 (dated Dec. 3, 2019) with English language translation.
International Preliminary Report on Patentability for PCT Patent App. No. PCT/JP2019/012360 (dated Dec. 24, 2020).

\* cited by examiner

GATE VALVE DEVICE

This application is a Continuation-in-Part under 35 U.S.C. § 120 of, and claims priority to, PCT Patent Application No. PCT/JP2019/012360, filed on Mar. 25, 2019, which claims priority under 35 U.S.C. § 119 to Japanese Patent Application No. 2018-112298, filed on Jun. 12, 2018, both of which are incorporated by reference.

TECHNICAL FIELD

The present invention relates to a gate valve device interposed between, and adapted to partition, a first chamber and a second chamber which are in communication with each other.

BACKGROUND ART

This kind of gate valve device is known, e.g., in Patent Document 1. This gate valve device is provided with: a communication block (valve main body) having opened therethrough a communication passage which allows for communication between a first chamber and a second chamber; and a valve unit having a valve plate which is moveable forward and backward between a partitioning position in which the valve plate is seated on seating surfaces formed in the communication passage, thereby partitioning (i.e., closing) the communication passage, and an open position in which the valve plate is away from the seating surfaces, thereby opening the communication passage. The width of the communication passage is generally set depending on the width of an object to be transferred (e.g., a silicon substrate, a glass substrate) which is transferred between the first chamber and the second chamber. The plate length of the valve plate will accordingly be set. In addition, according to this arrangement, a plurality of shafts are vertically disposed on a lower surface of the valve plate at a distance from one another in the direction of plate length of the valve plate. Motive power of drive means such as air cylinders, motors, and the like is transmitted to each of the shafts, thereby causing the valve plate to move forward and backward. In this case, it is normal practice, e.g., to design the elements such as the number and the distance of the shafts to be disposed on the valve plate, as well as the power to be applied to each of the shafts so that, at the time of moving the valve plate from the open position to the partitioning position, the seal members disposed on the valve plate come into pressurized contact with the seating surfaces substantially uniformly (preferably substantially simultaneously) over the entire length of the sealing members.

It is to be noted here that, in the vacuum processing apparatus in which the above-mentioned gate valve device is generally used, there is a tendency in that the size of the substrate to be processed, as the object to be transferred, is getting larger and, in response to this tendency, the size of the vacuum processing apparatus, and consequently the size of the communication passage for the substrate to pass therethrough also are being changed in size. At this time, it is necessary to change (make longer) the plate length of the valve plate depending on the change in size of the communication passage. However, in the above-mentioned conventional example, there is a problem in that the construction of the gate valve device becomes complicated. By the way, in the above-mentioned conventional example, once the plate length of the valve plate has been changed, the above-mentioned elements will have to be reviewed so as to newly design them again. This brings about poor ease-of-use.

PRIOR ART DOCUMENTS

Patent Documents

Patent Document 1: JP-A-2011-144922

SUMMARY OF THE INVENTION

Problems that the Invention is to Solve

In view of the above-mentioned points, this invention has a problem of providing a gate valve device of a simple arrangement.

Means for Solving the Problems

In order to solve the above-mentioned problem, this invention is a gate valve device interposed between, and adapted to partition, a first chamber and a second chamber which are in communication with each other. The gate valve device comprises: a communication block having a communication passage allowing the first chamber and the second chamber to come into communication with each other; and a valve unit having a valve plate movable forward and backward between a partitioning position in which the valve plate gets seated on a seating surface provided in the communication passage to thereby close the communication passage, and an open position in which the valve plate is away from the seating surface such that a lower end part of the valve plate comes into pressurized contact with a surface of a band-shaped base material that is transferred through the communication passage between the first chamber and the second chamber and that, due to a force of this pressurized contact, a back surface of the base material is seated on the seating surface. The valve unit has: provided that a moving direction of the valve plate from the open position to the partitioning position is defined as a vertical direction, a valve box which is of a bottomed cylindrical shape and is mounted on an upper surface of the communication block and into which is inserted an upper end part of the valve plate with sealing means interposed against an inner side wall; provided that such an upper surface of the valve plate as is lying to face an upper inner surface of the valve box is defined as a pressure-receiving surface, a pressure application part which applies gas pressure to the pressure-receiving surface; and a guide part which guides the forward and backward movement of the valve plate. When the gas pressure is applied to the pressure-receiving surface, such a lower end part of the valve plate as will protrude from the valve box to partially penetrate the communication block is arranged to get seated on the seating surface disposed in the communication passage of the communication block; wherein the lower end of the valve plate has formed therein a groove extending upward and into this groove is inserted a roller-shaped sealing member with a central shaft, the sealing member constituting such a lower end part of the valve plate as is capable of coming into pressurized contact with the surface of the base material, and wherein both axial side-wall surfaces of the groove has formed therein opening parts such that the end parts of the central shaft of the sealing member are inserted into the opening parts and pivotally supported with a clearance.

According to this invention, an arrangement has been employed in which, when the upper surface of the valve plate is defined as a pressure-receiving surface, the pressure-receiving surface is applied with the gas pressure, thereby moving forward and backward the valve plate. As a result, a gate valve device of a simple constitution can be obtained. By the way, even in case the plate length of the valve plate is changed, the work of re-designing the (design) elements is not necessary. The gate valve device can conveniently be made adjustable to the change in length of the valve plate.

According to this invention, the valve plate preferably further comprises an urging force application means for applying the valve plate with an urging force in the upward and downward direction. According to this arrangement, by stopping the application of the gas pressure to the pressure-receiving surface of the valve plate, the valve plate can be moved upward.

In addition, in this invention, preferably the valve box further comprises a relief passage for relieving the gas pressure into the atmosphere such that a pressure above a predetermined value does not operate on the sealing means. According to this arrangement, the pressure operating on the sealing means can be prevented from getting excessive and from flowing into the communication passage.

Still furthermore, at the time of transferring the band-shaped base material between the first chamber and the second chamber through the communication passage, the lower end part of the valve plate is brought into pressurized contact with the surface of the base material; and the rear surface, that has been deformed by the force due to the pressurized contact, of the base material is seated on the seating surface, i.e., the lower end part of the valve plate is seated on the seating surface through the base material, whereby the first chamber and the second chamber are partitioned.

MODES FOR CARRYING OUT THE INVENTION

With reference to the drawings, a description will hereinbelow be made of an embodiment of a gate valve device IV, according to this embodiment, which is interposed between a first chamber C1 and a second chamber C2 so as to partition (close) both the chambers.

Figure 1:
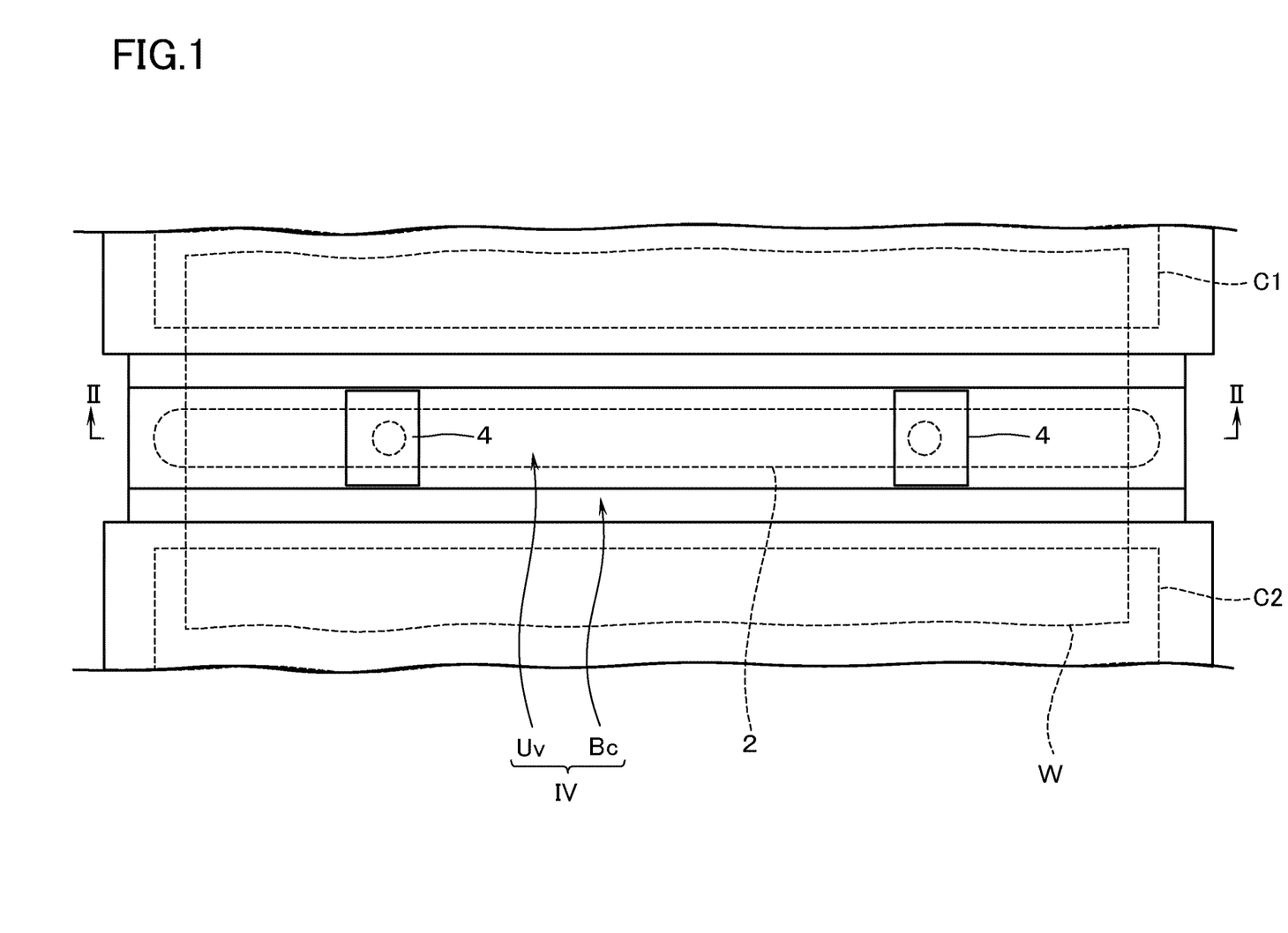
FIG. 1 is a general plan view showing a gate valve device in an embodiment of this invention in which the gate valve device is interposed between a first chamber and a second chamber.
Figure 2:
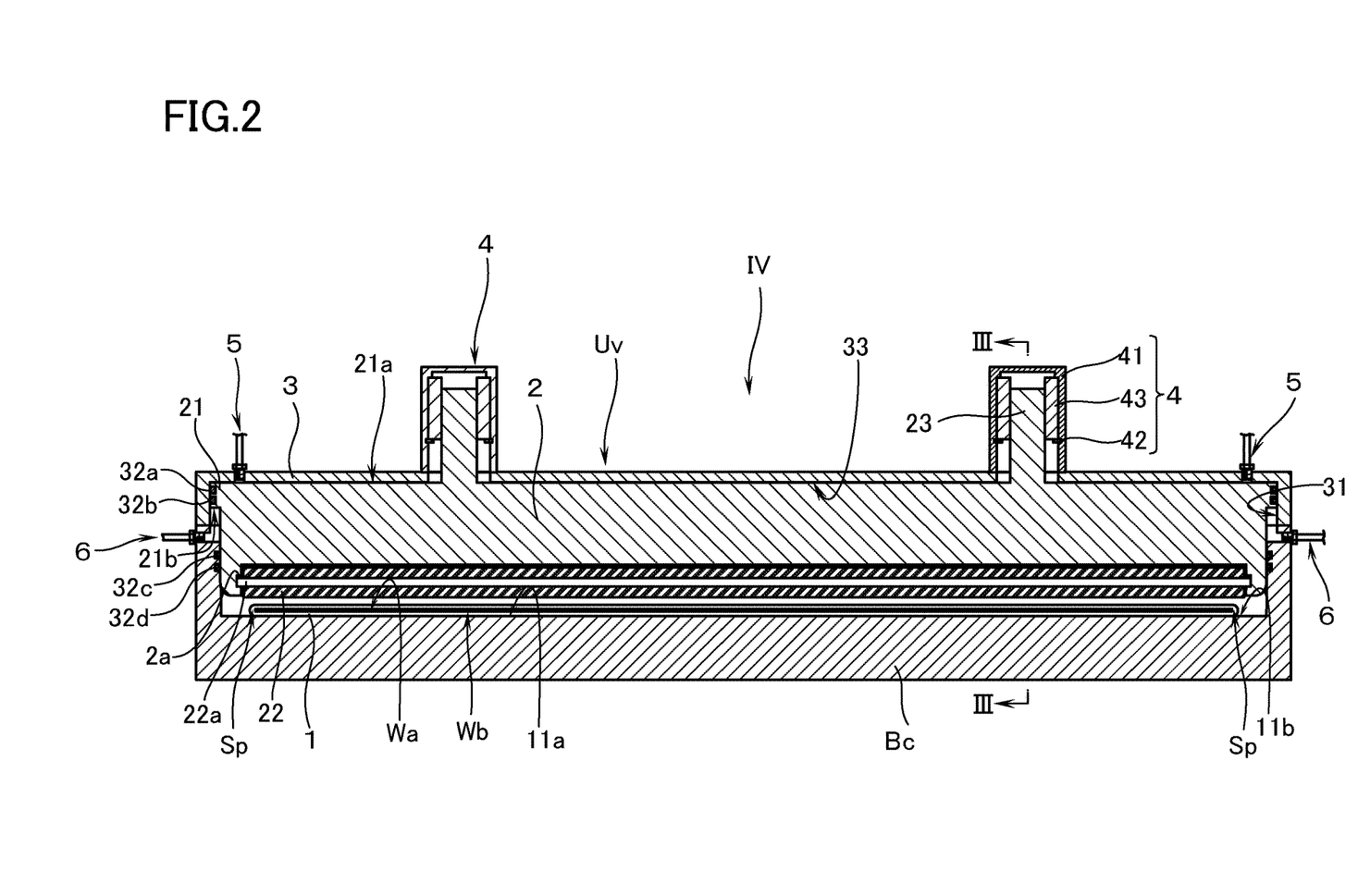
FIG. 2 is a vertical sectional view taken along the line II-II shown in FIG. 1.

As shown in FIGS. 1 through 5, the gate valve device IV is provided with: a communication block Bc having a communication passage 1 which allows the first chamber C1 and the second chamber C2 to be communicated with each other and which also allows a band-shaped base material W to be transferred; and a valve unit Uv having a valve plate 2 movable forward and backward between a partitioning position in which the valve plate 2 gets seated on seating surfaces 11a, 11b, 11c (to be described hereinafter) provided in the communication passage 1, thereby closing the communication passage 1, and an open position in which the valve plate 2 is away from the seating surfaces. In the following description, explanations will be made on condition that the direction of movement of the valve plate 2 moving from the open position toward the partitioning position is defined as the "downward" of the vertical direction and that right-and-left direction in FIG. 2 is defined as the direction of the length of the valve plate 2.

The valve unit Uv is mounted on an upper surface 12 of the communication block Bc through O-rings serving as sealing means 13. The valve unit Uv is provided with a bottomed cylindrically shaped valve box 3 which has inserted therethrough a flange part serving as an upper end part 21 of the valve plate 2 against an inner side wall (inner wall of cylinder of substantially race track shape) 31 through O-rings serving as sealing means 32a, 32b. As the O-rings 13, 32a, 32b and as the O-rings serving as the aftermentioned sealing means 32c, 32d, there may be used such things, e.g., made of fluoro rubber. By the way, in this embodiment, a description was made of a case of providing two sealing means 32a, 32b. In case, however, the pressure difference working on the upper surface 21a and the lower surface 21b of the valve plate 2 can be effectively insulated, the sealing means may be arranged to be of a singular construction.

The valve plate 2 rotatably supports the sealing member 22 with a shaft (central shaft) 22a at a groove 20, the groove 20 extending upward, that is formed in the lower end part of the valve plate 2. The curvature of the groove 20 is made to be equivalent to the curvature at the surface of the sealing member 22 of a rubber roller-shaped member (see FIG. 2). By the way, the length in the plate length direction of the groove 20 is sized longer than the length of the sealing member 22. The locking between the sealing member 22 and the valve plate 2 is performed by means of pivoting in so-called clearance fit in which a clearance exists between the shaft 22a of the sealing member 22 and opening parts 2a which are disposed in both axial side-wall surfaces of the groove 20 of the valve plate 2, i.e., the clearance exists between the opening parts 2a and end parts of the shaft 22a inserted into the opening parts 2a. As a result, the following arrangement has been made. Namely, the valve plate 2 moves downward and the sealing member 22 comes into contact with the surface Wa of the base material W that is initially extended between the guide rollers Gr1, Gr2. Thereafter, the valve plate 2 pushes down the base material W so that the rear surface Wb (the surface opposite to the front surface Wa) of the base material W is brought into contact with the seating surface 11a. The valve plate 2 is moved further downward so that the inner circumference of the groove 20 comes into contact with the sealing member 22. When the valve plate 2 is further pressed (urged) downward, i.e., when the valve plate 2 is moved to the partitioning position, the lower end of the sealing member 22 is pressed to the surface Wa of the base material W. The rear surface Wb of this pressed base material W is arranged to be pressed against the seating surface 11a. Together with the above-mentioned arrangement, the lower surface region on both end parts in the plate length direction on the lower end of the sealing member 22 is arranged to be pressed against the seating surface 11b that is positioned on the outside of the base material W. In combination with the above, both side parts in the longitudinal direction of the sealing member 22 are arranged to be brought into pressing contact with the seating surface 11c that is the inner surface of the opening into which the valve plate 2 of the communication block Bc is inserted. On the outside of the base material W in a state of pressing contact, there does theoretically exist a minute clearance Sp that is inevitably formed due to the step (i.e., difference in level) corresponding to the thickness of the step-shaped base material W constituted by a plane seating surface 11a and the base material W. However, by controlling the leak rate by appropriately selecting the surface hardness of the sealing member 22, and the like, it becomes possible to substantially fill up this minute clearance Sp. According to these arrangements, both chambers C1, C2 are prevented from getting into communication with each other. In other words, when the valve plate 2 is in the partitioning position, as shown in hatched lines in FIG. 5, as a result of forming of a sealing region R1 of substantially square shape, as seen in plan view, and a sealing region R2 of linear shape formed by connecting opposing short sides of the sealing region R1, both the chambers C1, C2 are partitioned. By the way, substantially square shape includes not only the frame shape, but also a race-track shape.

On the upper surface 21a of the valve plate 2, there are provided in a protruding manner two rod parts 23 at a predetermined distance from each other as seen in the direction of the plate length. The rod parts 23 may be formed integral with the valve plate 2 or may be formed independent thereof. The valve box 3 is provided with a guide part 4 which guides the forward and backward movement (up and down movement) of the valve plate 2. As the guide part 4 there may be used a known linear guide mechanism which is constituted, e.g., by a case 41, and a sleeve 43 in which the rod part 23 is inserted while being positioned by using a stopper device 42 such as a stop ring and the like inside the case 41. In addition, depending on the required positional accuracy of the vertical movement, taking advantage of the fact that the sliding surfaces of the sealing means 32a, 32b and the sliding surfaces of the sealing means 32c, 32d are made into a so-called piston/cylinder construction, there may be employed a construction serving the dual purpose of a guide part so that the guide part 4 may be omitted.

Figure 4:
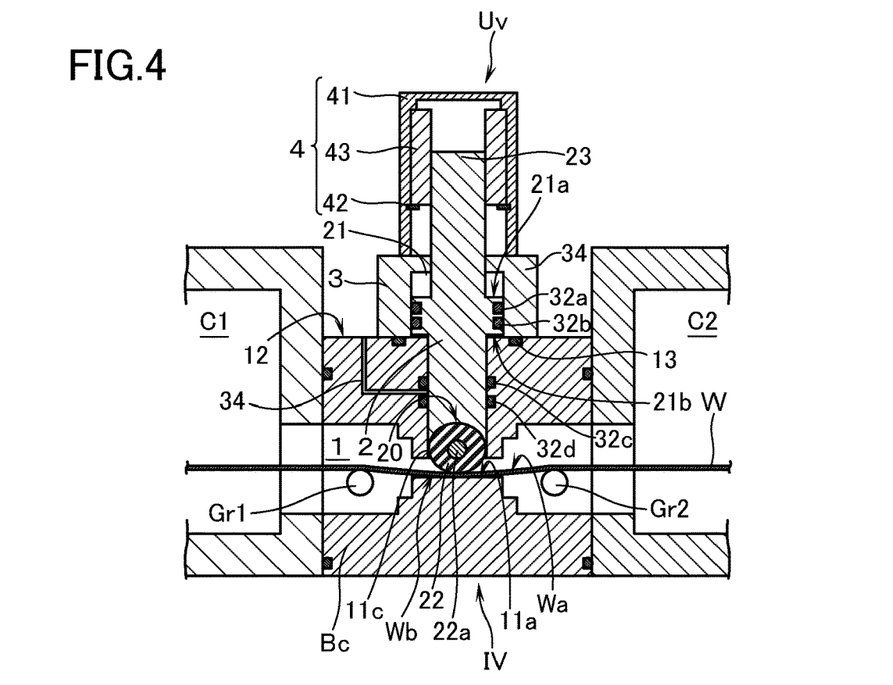
FIG. 4 is a vertical sectional view of the gate valve device showing a state in which the valve plate has been moved to the partitioning position.
Figure 5:
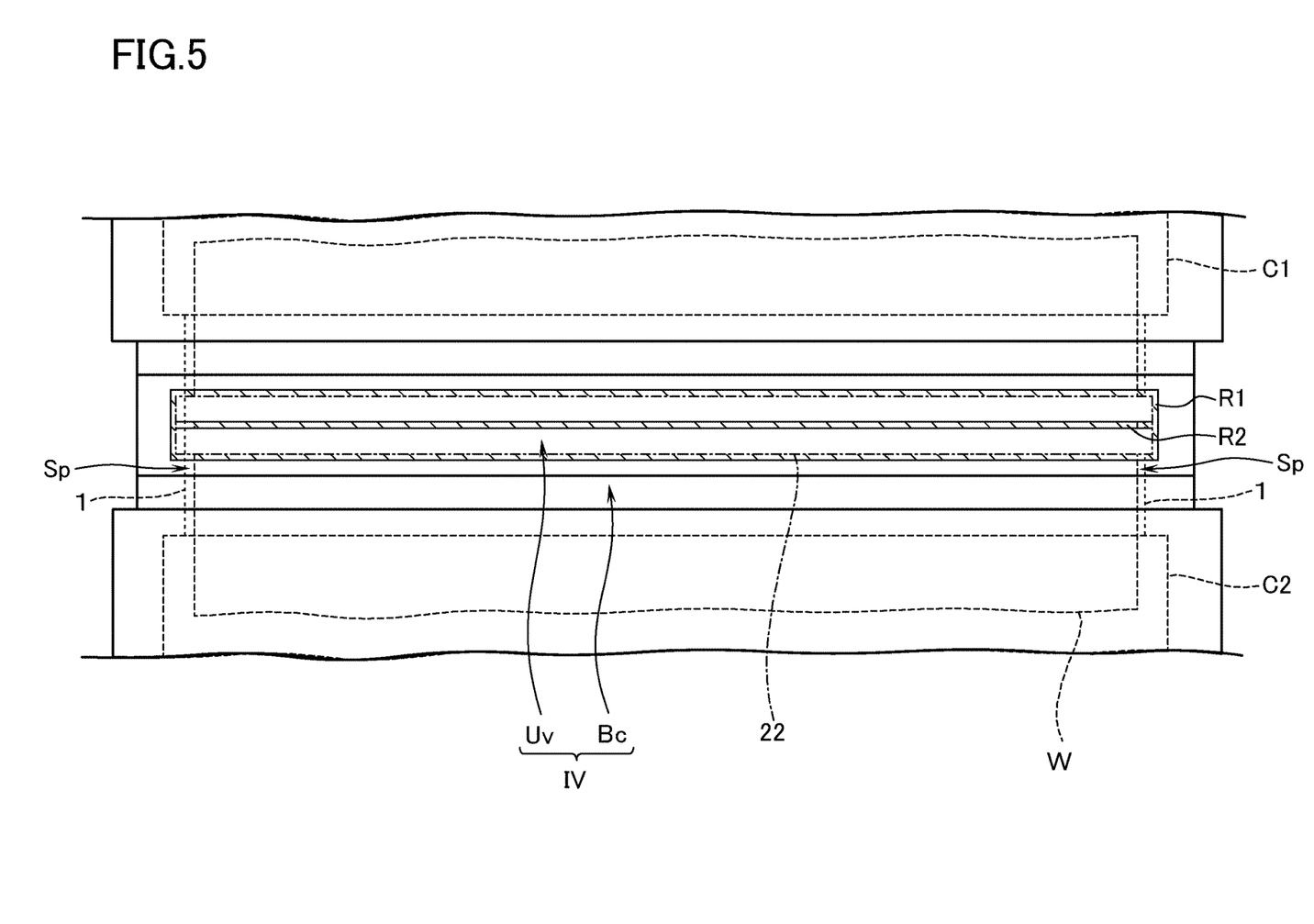
FIG. 5 is a plan view schematically showing a sealing region in a state in which the valve plate has been moved to the partitioning position.

The gate valve device IV has a plurality of (two in this embodiment) pressure application means (pressure application part) 5 at a distance from each other as seen in the valve length direction, the pressure application means 5 applies gaseous pressure to a pressure-receiving surface 21a which is defined to be such an upper surface 21a of the valve plate 2 as is lying opposite to an upper inner surface 33 of the valve box 3. As the pressure application means 5, there may be used a known compressed air introduction mechanism which introduces compressed air of a predetermined pressure and, therefore, detailed description thereof is omitted here. Typical pressure of the compressed air is 0.5 MPa. By the way, the pressure-receiving area by (i.e., area to receive pressure of) the pressure application means 5 will be such an upper area indicated by an arrow as is enclosed by the sealing means 32. With reference to FIG. 4, in such a portion of the communication block Bc as is positioned between the sealing means 32c and the sealing means 32d when the valve plate 2 is moved to the partitioning position, there is opened a relief passage 34 which lets the gaseous pressure to escape so that the O-ring 32d can be prevented from being exposed to a pressure above the atmospheric pressure. According to this arrangement, when gaseous pressure is applied from the pressure application means 5 or an urging force application means 6 to the upper surface 21a or the lower surface 21b of the valve plate 2, the differential pressure which operates on the O-ring 32d will exceed the atmospheric pressure. As a result, the gas that has increased in volume can be prevented from flowing, at a leak rate above the atmospheric pressure, into the communication passage 1. Alternatively, a vacuum exhaust means such as a vacuum pump and the like may be connected to the open end of the relief passage 34 so as to evacuate the relief passage 34 down to a low-vacuum atmosphere. According to this arrangement, the pressure to operate on the O-ring 32d through the relief passage 34 can further be made lower and, still furthermore, the leak amount to flow into each of the chambers C1, C2 through the communication passage 1 can be reduced.

In addition, the gate valve device IV is further provided with urging force application means 6 which applies an urging force in the upward-movement direction of the valve plate 2. As the urging force application means 6, there may be used a known compressed air introduction mechanism which applies gas pressure to the lower surface 21b of the flange part 21 of the valve plate 2. Therefore, detailed description thereof will be omitted here. By the way, the effective area to receive gaseous pressure of the urging force application means 6 at the time of moving the valve plate 2 upward will be the area to be obtained by subtracting the area enclosed by the O-ring 32c from the area enclosed by the O-ring 32b. The area enclosed by the O-ring 32d varies with the pressure in the first chamber C1 and the second chamber C2, and varies with the area to be enclosed by the O-ring 32a and the pressure of the pressure application means 5. In a state of a typical production operation, the upper side of the O-ring 32a is atmospheric pressure, and the lower side of the O-ring 32d will become a pressure far below a low-vacuum pressure. In other words, in a state of production operation, in order to move upward the valve plate 2 to the open position, it is necessary to apply a force above balancing relative to such a force by the atmospheric pressure as will operate on the side of the O-ring 32a in addition to the self weight of the valve plate 2. As noted above, it is apparent that the pressure-receiving area of the lower surface 21b of the valve plate 2 is smaller than the area enclosed by the O-ring 32a. Therefore, in a state of production operation, a pressure above the atmospheric pressure must be introduced by the urging force application means 6. In other words, without the relief passage 34, the O-ring 32d will be exposed to the pressure above the atmospheric pressure and, as compared with the case without the relief passage 34, the leak amount will be much larger.

Figure 3:
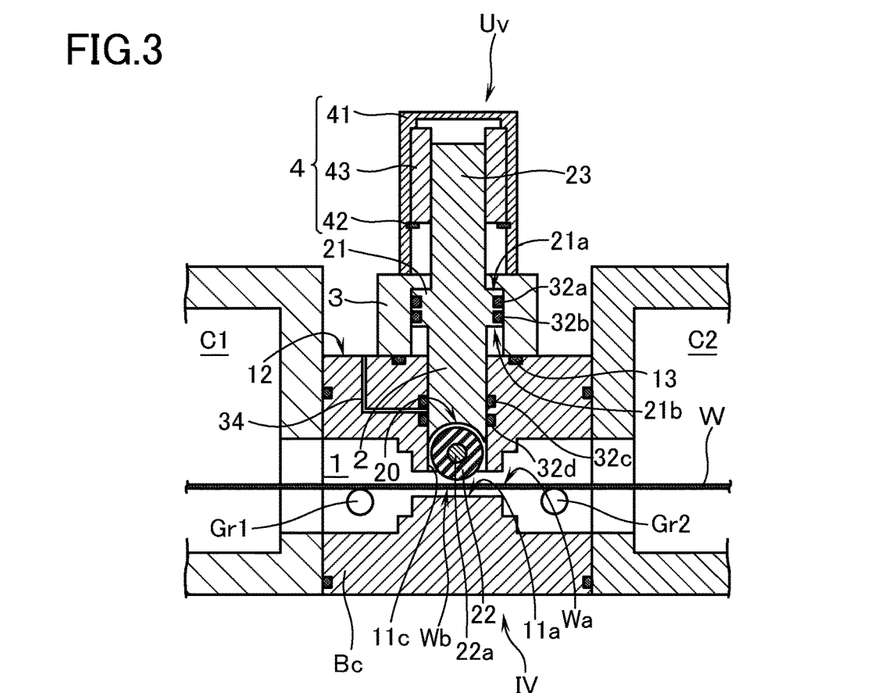
FIG. 3 is a vertical sectional view of the gate valve device showing a state in which a valve plate has been moved to an open position.

Further, the gate valve device IV is provided with guide rollers Gr1, Gr2 and, at the time of transferring the base material W as shown in FIG. 3, the base material W is arranged to be kept out of contact with the communication block Bc. By the way, the guide rollers Gr1, Gr2 may be disposed in the first chamber C1 and the second chamber C2. Further, the number of guide rollers Gr1, Gr2 can be appropriately set depending on the size of the base material W and the communication block Bc.

Description will hereinbelow be made of the movements of the above-mentioned gate valve device IV. As shown in FIG. 2 and FIG. 3, in a state in which gaseous pressure from the urging force application means 6 is being applied to the lower surface 21b of the flange part 21 of the valve plate 2, the lower end of the sealing member 22 of the valve plate 2 will be away from the surface Wa of the base material W. In this case, the base material W can be transferred through the communication passage 1 of the communication block Bc (open position). At this time, in order for the base material W not to come into contact with the communication block Bc, the base material W is guided by the guide rollers Gr1, Gr2.

In partitioning the first chamber C1 and the second chamber C2 with the valve plate 2, by stopping the introduction of the compressed air from the urging force application means 6, the application of the gaseous pressure to the lower surface 21b of the flange part 21 of the valve plate 2 is stopped. At the same time, compressed air is introduced from the pressure application means 5, and gaseous pressure is applied to the pressure-receiving surface 21a of the valve plate 2. According to these operations, as shown in FIG. 4, the valve plate 2 will be moved to the partitioning position, so that the lower end of the sealing member 22 disposed on the lower end of the valve plate 2 that protrudes from the valve box 3 will push the surface Wa of the base material W. By means of this urging force, the rear surface Wb of the base material W that has been deformed into substantially V-shape due to this urging force will be pressed to the seating surface 11a that is disposed in the communication passage 1 (i.e., the lower end of the sealing member 22 constituting the lower end part of the valve plate 2 is seated on the seating surface 11a through the base material W). At the same time as this urging contact, the lower end of the sealing member 22 will be urgingly contacted also with the seating surfaces 11a, 11b that are positioned on the outside of the base material W. In addition, both longitudinal side parts of the sealing member 22 come into urging contact with the seating surface 11c, so that the first chamber C1 and the second chamber C2 are partitioned. It is to be noted here that, since the base material W has a thickness, a step (difference in height) will inevitably be generated between the surface Wa of the base material W that is pressingly contacted with the seating surface 11a and the seating surface 11a that is positioned on the outside of the base material W. However, in order for the step to be capable of being filled up (namely, in order not to cause the clearance attributable to this step), the hardness of the sealing member 22 is appropriately selected, and there will be generated no problem in the partitioning performance between both the chambers C1, C2. By the way, in this embodiment, the seating surface 11b shall be understood to refer to such a part (remainder) of the seating surfaces 11a as will not be covered by the base material W.

By the way, in case the first chamber C1 and the second chamber C2 are in vacuum atmosphere, there is a case in which the valve plate 2 can be moved downward to the partitioning position even if the pressure above the O-ring 32a is atmospheric. And also, provided that a pressure enough for the sealing member 22 to make an urging contact (a pressurized contact), in this case, the introduction of the compressed air from the pressure application means 5 is not always necessary. It will be enough if the gaseous pressure applied by the urging force application means 6 is released.

In this manner, according to this embodiment, there has been employed an arrangement in which the upper surface 21a of the valve plate 2 is defined as a pressure-receiving surface, and in which the valve plate 2 is moved forward and backward by applying gaseous pressure to the pressure-receiving surface 21a. As a result, there can be employed a design to make equivalent to each other the force to urge (press) the sealing member 22 and the pressure-receiving force due to the area of the pressure-receiving surface 21a.

In other words, if the length in the longitudinal direction of the valve plate 2 is made longer or shorter, the area of the pressure-receiving surface 21a varies. A design can be employed to make equivalent to each other the force to the pressure-receiving surface 21a and the pressing force of the sealing member 22. According to this arrangement, even if the plate length of the valve plate 2 is changed, it can make unnecessary the work of re-designing of the (design) elements to move the valve plate 2 forward and backward. An arrangement can be made easy to use by facilitating to cope with the change in the length of plate length of the valve plate 2. Moreover, by disposing the guide part 4, the torsion of the O-rings 32a, 32b, 32c, 32d can be prevented, so that the valve plate 2 can be smoothly moved between the open position and the partitioning position.

In addition, the rotatable supporting (pivoting) of the sealing member 22 has been selected to be a clearance fit, and is arranged to urge (press) the sealing member 22 by the groove 20 along the upper surface thereof. According to this arrangement, even if the valve plate 2 is moved downward in a state of being inclined, minute sliding in the horizontal direction of the sealing member 22 is allowed partly due to the fact that the accuracy of the guide part 4 is not very high, and due to the fact that the upper surface of the sealing member 22 and the groove 20 come to be in contact with each other in a manner to follow the upper surface of the sealing member 22. Further, since the pressure-receiving surface 21a is a surface to receive the air pressure, there exists no vector element in the pressing direction of the air pressure. Based on the above, there can be prevented the occurrence of disadvantage in that the sealing member 22 comes to be in one-sided (partial) contact with the surface Wa of the base material W. In other words, without the necessity of demanding a high accuracy on the guide part 4, one-sided contact can be prevented by the accuracy of the sealing member 22. By the way, if the rotatable supporting (pivoting) of the sealing member 22 is selected to be of transition fit or shrink fit, a high guiding accuracy is required of the guide part 4 in order for the sealing member 22 to be urged at a uniform pressure over the entire length of the valve plate. If the guiding accuracy of the guide part 4 is low, urging cannot be made at a uniform pressure over the entire plate length of the sealing member 22. As a consequence, the sealing member 22 sometimes makes a partial contact with the surface Wa of the base material W.

Description has so far been made of an embodiment of this invention, but this invention shall not be limited to the above. In the above-mentioned embodiment, description was made of an example in which the urging force application means 6 is constituted by a compressed air introduction mechanism, but an arrangement may be made so as to urge the valve plate 2 by a spring in the upward direction.

In the above-mentioned embodiment, a description was made of an example in which the communication block Bc and the valve unit Uv are formed in separate parts, but both may be integrally formed.

In the above-mentioned embodiment, the lower end shape (i.e., the lower end shape of the rubber roller-shaped sealing member 22) of the valve plate 2 in the open position is of U-shape as seen in section (by the way, the external shape of the rubber roll is cylindrical shape). But this shape is not particularly limited as long as the valve plate 2 can be seated into the seating surfaces 11a, 11b of the communication block Bc; they may, for example, be hexagonal, trapezoidal or inverted triangle in cross section. The required shape is the one that can apply sufficient urging force in the vertical direction to each of the pressing-contact surfaces uniformly.

In any of the cases, the lower end of the sealing member 22 urges downward the surface Wa of the base material W, and the rear surface Wb of the base material W that has been deformed under the urging force substantially into V-shape is caused to be pressed against the seating surface 11a. The lower end of the sealing member 22 is pressed also against the seating surfaces 11a, 11b that are positioned on the outside in the plate length direction of the base material W. In combination with the above, as a consequence in that both side parts in the longitudinal direction of the sealing member 22 are pressed against the seating surfaces 11c, both the chambers C1, C2 can be partitioned from each other. By the way, an arcuate cross section at the lower end of the valve plate 2 (i.e., at the lower end of the sealing member 22) is the most advantageous shape in that, when the valve plate 2 has moved to the partitioning position, there can be avoided the difficulty in equalizing the pressing forces to the seating surface 11b generated at each top parts in the case that the lower end of the valve plate 2 has a polygonal cross section. By the way, in order to perform pressing of the side parts, the seating surface 11c must maintain an inclined wedge-shaped surface at the time of moving to the partitioning position. At this time, the generation of a step (elevation change) between the surface Wa of the base material W and the seating surface 11b is inevitable. However, by setting the hardness of the sealing member 22 to enable this step to get buried, both the chambers C1, C2 can surely be partitioned.

In addition, in the above-mentioned embodiment, a description was made of an example of rotatably supporting the sealing member 22 with the shaft 22a. It is also possible to use a sealing member in the shape of a rubber roller without a shaft. In this case, there may be formed a notch which is smaller by one round than the sealing member, the notch being formed at the bottom of such an opening part of the communication block Bc as will receive the valve plate 2 to be inserted into the inside of the opening part. The sealing member may thus be supported by the peripheral portion of the notch.

Further, in the above-mentioned embodiment, a description was made of an example in which the seating surface 11a is plane (flat). However, the seating surface may be of a curved surface in an arcuate shape as seen in section, having a curvature equivalent to the sealing member 22. According to this arrangement, the press-contact area of the sealing member 22 relative to the seating surface can be increased. Even if the dust (foreign matter) gets bitten between the sealing member 22 and the seating surface, the occurrence of insufficient (or poor) closing can advantageously be restrained to the best extent possible.

Figure 6:
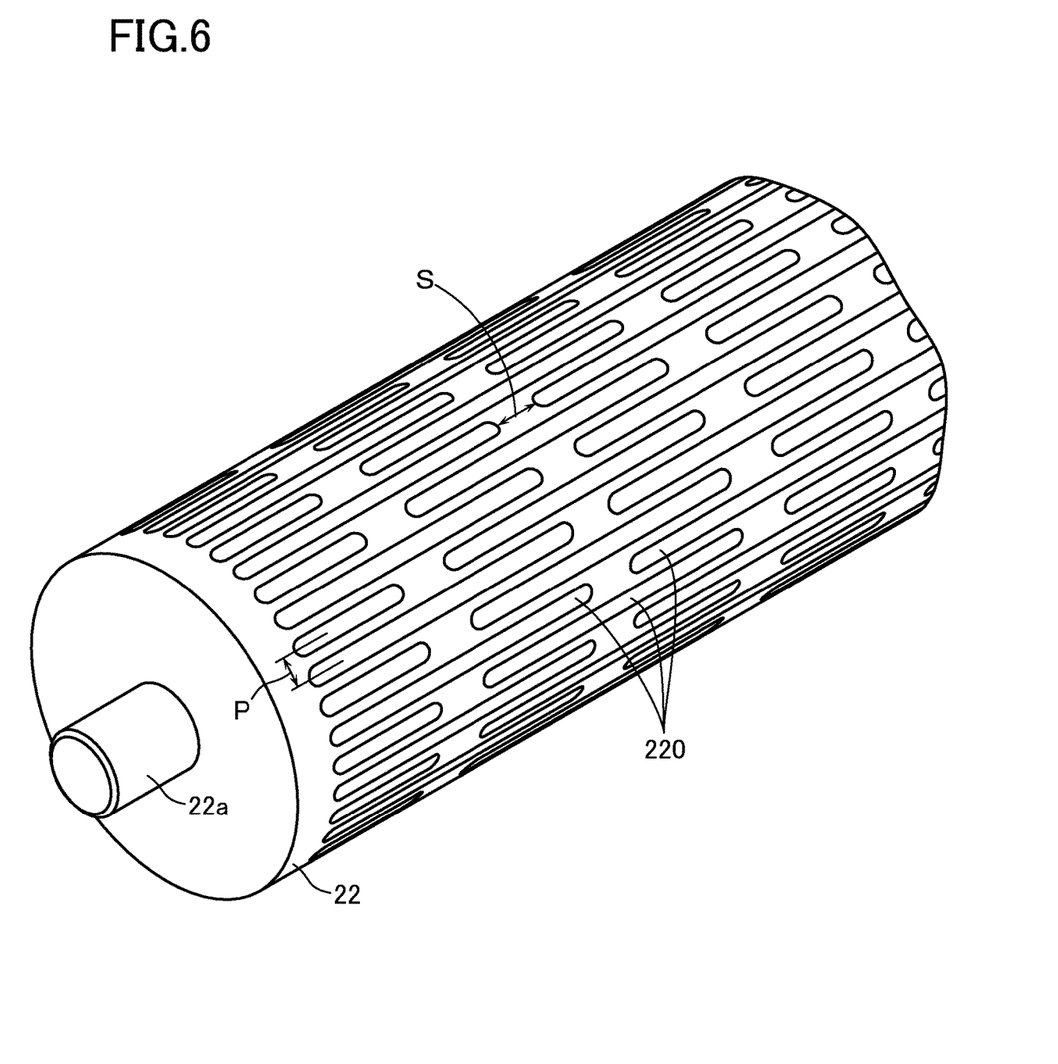
FIG. 6 is a perspective view showing a modified example of a sealing member of the gate valve device according to this invention.
Figure 7:
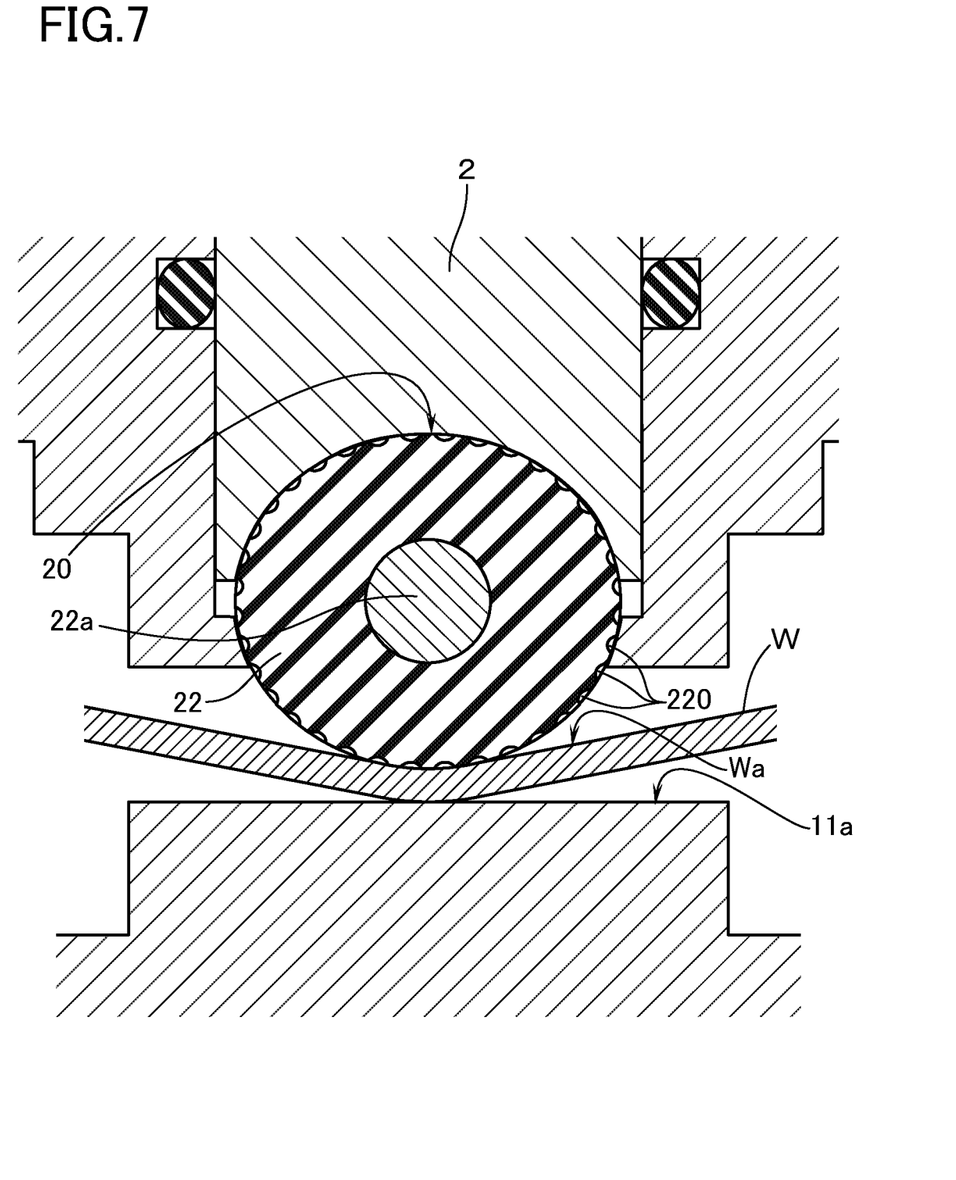
FIG. 7 is a vertical sectional view of the gate valve device of a modified example of this invention showing a state in which the valve plate has been moved to the partitioning position.

By the way, at the time for the valve plate 2 to move from the partitioning position to the open position, i.e., at the time when the sealing member that has been pressed to the surface Wa of the base material W is going to leave the surface Wa in question, there is a disadvantage in that the base material W stays adhered to the sealing member 22. This disadvantage, however, is likely to occur when the seating surface to which the sealing member 22 is kept seated is the above-mentioned curved surface in an arcuate shape as seen in section. As a solution, as shown in FIG. 6, it is preferable to form, to a predetermined depth, grooves 220 that are elongated in the direction of the valve length on the circumference of the rubber roller-shaped sealing member 22. These grooves 220 shall preferably be formed in a staggered manner. By providing the grooves 220 in the manner as noted above, the area of contact between the sealing member 22 and the base material W can be reduced and, as a result, the sticking of the base material W can be prevented. In this case, the length of pressed surface (length of the base material as seen in the transfer direction in the pressing region in which the plane of the base material W is projected on the communication block Bc) shall preferably be made larger than the pitch of the groove 220 (in case of staggered grooves 220, above the pitch at which the staggering is repeated). Further, in the region of the seating surface 11b, because the base material is not present and because the distance of pressing contact will be reduced, preferably the groove 220 shall not be formed therein. As another advantage, the pressing force required is a sum of contact pressures of the sealing member relative to the pressing area of the sealing member, in case the pressing area is increased, ordinarily pressing force will also be increased. But the pressing force corresponding to the area of the grooves 220 can advantageously be decreased.

In addition, as another embodiment, it is effective to secure the amount of transfer of the valve plate 2 in the following manner. In other words, at the time when the sealing member 22 that has been pressed to the surface Wa of the base material W tries to get released from the surface Wa in question, the following arrangement may be employed: i.e., the state in which the base material W gets adhered to the sealing member 22 is maintained; by moving upward the valve plate 2 so as to bring the surface Wa of the base material W into contact with the communication block Bc, a force in the direction of peeling off is generated through the base material W; as a result, the amount of movement is secured, the movement being such as to enable to release the base material W off from the sealing member 22. In the conventional example, there exists a method of releasing the sealing member 22 by rotating, and the like. In this method, however, it is necessary to to provide a new constitutional element such as a rotating mechanism and the like. On the other hand, the above-mentioned arrangement requires no new constitutional element, but can be materialized by a simple arrangement in that the amount of movement of the valve plate is defined. Together with the above, relating to the contact element between the communication block Bc and the base material W, there may be employed a shape such as narrowing the opening, narrowing the up and down direction near the opening part of the communication passage, in order to obtain a further effect in that the force in the peeling direction can effectively be obtained.

In addition, in the above-mentioned embodiment, a description has been made of a case in which the lower end of the sealing member 22 gets seated on the seating surface 11a through the surface Wa of the base material W, the lower end in question gets seated on the seating surface 11b, and also the side parts of the sealing member 22 get seated on the seating surface 11c. But this invention shall not be limited to the above. Depending on the shape of the base material W, the shape of the communication passage 1, and the position of the seating surface, other portions of the sealing member 22 may be arranged to get seated.

Further, in the above-mentioned embodiment, a description was made of an example having a sleeve 43 as the guide part 4. However, as long as the guide part can guide the forward and backward movement of the valve plate 2, there is no particular limitation. For example, the known one for guiding along the guide rails may be used as the guide part.

In addition, in the above-mentioned embodiment, a description was made based on an example in which two compressed air introduction mechanisms 5 were provided, but at least one compressed air introduction mechanism 5 may be provided. Therefore, the number of the compressed air introduction mechanisms 5 may be appropriately set depending on the speed of movement of the valve plate 2. In case one compressed air introduction mechanism 5 is provided, it shall preferably be disposed in the center as seen in the valve length direction and, in case more than three compressed air introduction mechanisms 5 are provided, they shall preferably be disposed at an equal distance from one another in the valve length direction.

Further, the position of disposing the relief passage 34 shall not be limited to the position as shown in FIG. 3 and FIG. 4, but may be disposed such that the pressure above the atmospheric pressure does not operate on the sealing means 32*d*.

EXPLANATION OF MARKS

Bc communication block
IV gate valve device
Uv valve unit
1 communication passage
2 valve plate
2*a* opening parts
3 valve box
4 guide part
5 pressure application means
6 urging force application means
11*a*, 11*b*, 11*c* seating surface
12 upper surface of communication block
20 groove
21*a* upper surface (pressure-receiving surface) of valve plate 2
22 sealing member
22*a* shaft (central shaft)
31 inner side wall of valve box 3
32*a*, 32*b*, 32*d* O-ring (sealing means)
33 upper inner surface of valve box
34 relief passage

The invention claimed is:

1. A valve unit having a valve plate movable forward and backward between
    a partitioning position in which the valve plate to be seated on a seating surface through a sealing member and a band-shaped base material provided in the communication passage to thereby close the communication passage, and
    an open position in which the valve plate is away from the seating surface
    such that a lower end part of the valve plate comes into pressurized contact with a surface of the base material that is transferred through the communication passage between the first chamber and the second chamber and
    that, due to a force of this pressurized contact, a back surface of the base material is seated on the seating surface;
wherein the valve unit has: provided that a moving direction of the valve plate from the open position to the partitioning position is defined as a vertical direction,
a valve box which is of a bottomed cylindrical shape and is mounted on an upper surface of the communication block and into which is inserted an upper end part of the valve plate with sealing means interposed against an inner side wall;
provided that such an upper surface of the valve plate as is lying to face an upper inner surface of the valve box is defined as a pressure-receiving surface, a pressure application part which applies gas pressure to the pressure-receiving surface; and a guide part which guides the forward and backward movement of the valve plate;
wherein, when the gas pressure is applied to the pressure-receiving surface, such a lower end part of the valve plate as will protrude from the valve box to partially penetrate the communication block is arranged to get seated on the seating surface disposed in the communication passage of the communication block;
wherein the lower end of the valve plate has formed therein a groove extending upward and into this groove is inserted the roller-shaped sealing member with a central shaft, the sealing member constituting such a lower end part of the valve plate as is capable of coming into pressurized contact with the surface of the base material, and
wherein both axial side-wall surfaces of the groove has formed therein opening parts such that the end parts of the central shaft of the sealing member are inserted into the opening parts and pivotally supported with a clearance.

2. The gate valve device according to claim 1, wherein the valve plate further comprises an urging force application means for applying the valve plate with an urging force in the upward and downward direction.

3. The gate valve device according to claim 1, wherein the valve box further comprises a relief passage for relieving the gas pressure into the atmosphere such that a pressure above a predetermined value does not operate on the sealing means.

\* \* \* \* \*